US006413298B1

(12) United States Patent
Wnek et al.

(10) Patent No.: US 6,413,298 B1
(45) Date of Patent: Jul. 2, 2002

(54) WATER- AND ION-CONDUCTING MEMBRANES AND USES THEREOF

(75) Inventors: Gary Edmund Wnek, Midlothian, VA (US); Scott G. Ehrenberg, New Port Richey, FL (US)

(73) Assignee: Dais-Analytic Corporation, Odessa, FL (US)

( * ) Notice: Subject to any disclaimer, the term of this patent is extended or adjusted under 35 U.S.C. 154(b) by 0 days.

(21) Appl. No.: 09/627,776

(22) Filed: Jul. 28, 2000

(51) Int. Cl.[7] ................................................ B01D 53/22
(52) U.S. Cl. ............................. 95/52; 96/4; 96/8; 96/14
(58) Field of Search ........................... 95/45, 52; 96/4, 96/7, 8, 11, 14

(56) References Cited

U.S. PATENT DOCUMENTS

| | | | | |
|---|---|---|---|---|
| 3,666,007 A | | 5/1972 | Yoshino et al. ............. 165/166 |
| 3,735,558 A | * | 5/1973 | Skarstrom et al. .......... 95/52 X |
| 3,735,559 A | | 5/1973 | Salemme ....................... 55/16 |
| 4,051,898 A | | 10/1977 | Yoshino et al. ............. 165/166 |
| 4,449,992 A | * | 5/1984 | Yamada et al. .................. 96/7 |
| 4,759,780 A | * | 7/1988 | Yamada et al. .................. 96/7 |
| 4,769,297 A | | 9/1988 | Reiser et al. ................. 429/17 |
| 4,871,461 A | * | 10/1989 | Karakane et al. .......... 95/52 X |
| 4,973,530 A | | 11/1990 | Vanderborgh et al. ........ 429/13 |
| 4,980,101 A | * | 12/1990 | Beck et al. ................. 96/14 X |
| 5,015,275 A | * | 5/1991 | Beck et al. ................. 96/14 X |
| 5,071,448 A | * | 12/1991 | Bikson et al. .............. 95/52 X |
| 5,348,691 A | | 9/1994 | McElroy et al. ........... 261/36.1 |
| 5,382,478 A | | 1/1995 | Chow et al. .................. 429/26 |
| 5,599,380 A | * | 2/1997 | Koros ......................... 96/4 X |
| 5,620,500 A | * | 4/1997 | Fukui et al. ................... 95/52 |
| 5,641,337 A | * | 6/1997 | Arrowsmith et al. ....... 95/52 X |
| 5,653,115 A | | 8/1997 | Brickley et al. ................ 62/94 |
| 5,843,209 A | * | 12/1998 | Ray et al. ...................... 95/52 |
| 6,048,383 A | * | 4/2000 | Breault et al. .............. 95/52 X |
| 6,053,965 A | * | 4/2000 | Lokhandwala ............. 95/52 X |
| 6,087,029 A | * | 7/2000 | Golovin et al. ............. 95/52 X |

FOREIGN PATENT DOCUMENTS

WO    WO99/20691    4/1999

OTHER PUBLICATIONS

Zhang et al., "Heat and Mass Transfer in a Membrane–Based Energy Recovery Ventilator", Journal of Membrane Science 163, (1999), pp. 29–38.

* cited by examiner

*Primary Examiner*—Robert H. Spitzer
(74) *Attorney, Agent, or Firm*—Helsin Rothenberg Farley & Mesiti P.C.; Mary Louise Gioeni, Esq.

(57) ABSTRACT

Water- and ion-conducting membranes composed of sulfonated statistical arylvinyl polymers, the arylvinyl polymer comprising at least one arylvinyl monomer and at least one olefin monomer and wherein aromatic moieties derived from the arylvinyl monomer are at least partially sulfonated, are used as proton-conducting membranes for production of electricity, as water-conducting membranes for humidification of fuel gases in fuel cells and heat and moisture exchange in heating/ventilation/air conditioning systems. Water-conducting membranes composed of sulfonated arylvinyl polymers, the arylvinyl polymer comprising at least one arylvinyl monomer and wherein aromatic moieties derived from the arylvinyl monomer are at least partially sulfonated are used for desalination of seawater.

33 Claims, 3 Drawing Sheets

WATER- AND ION-CONDUCTING MEMBRANES AND USES THEREOF

TECHNICAL FIELD

The present invention relates to water- and ion-conducting membranes used for fuel cells, for heat and moisture exchange in heating/ventilation/air conditioning systems and for desalination.

BACKGROUND OF THE INVENTION

Ion conducting membranes of various compositions are known. An overview of the subject is provided in Vincent, C. A., Polymer Electrolyte Reviews I (1987). Many ion-conducting polymers also conduct water. Ion conducting polymers composed of sulfonated hydrogenated block copolymers of styrene and butadiene are disclosed by Ehrenberg et al. in U.S. Pat. Nos. 5,468,574 and 5,679,482, the entire disclosure of which is incorporated herein by reference. The copolymers are described as useful for membranes in fuel cells. No other uses of the copolymers are mentioned.

A fuel cell device generates electricity directly from a fuel source, such as hydrogen gas, and an oxidant, such as oxygen or air. Since the process does not "burn" the fuel to produce heat, the thermodynamic limits on efficiency are much higher than normal power generation processes. In essence, the fuel cell consists of two catalytic electrodes separated by an ion-conducting membrane. The fuel gas (e.g., hydrogen) is ionized on one electrode, and the hydrogen ions diffuse across the membrane to recombine with the oxygen ions on the surface of the other electrode. If current is not allowed to run from one electrode to the other, a potential gradient is built up to stop the diffusion of the hydrogen ions. Allowing some current to flow from one electrode to the other through an external load produces power.

The membrane separating the electrodes must allow the diffusion of ions from one electrode to the other, but must keep the fuel and oxidant gases apart. It must also prevent the flow of electrons. Diffusion or leakage of the fuel or oxidant gases across the membrane can lead to explosions and other undesirable consequences. If electrons can travel through the membrane, the device is fully or partially shorted out, and the useful power produced is eliminated or reduced.

It is therefore an object of this invention to produce a membrane which allows the diffusion of ions, specifically protons, but prevents both the flow of electrons and the diffusion of molecular gases. The membrane must also be mechanically stable and free of porosity and pinholes which would allow passage of molecular gases.

In constructing a fuel cell, it is particularly advantageous that the catalytic electrodes be in intimate contact with the membrane material. This reduces the "contact resistance" that arises when the ions move from the catalytic electrode to the membrane and vice versa. Intimate contact can be facilitated by incorporating a material having the same composition as the membrane into the catalytic electrodes as a binder. [See Wilson and Gottesfeld *J. Appl. Electrochem.* 22, 1–7 (1992)] It is therefore an object of the invention to produce a membrane wherein such intimate contact is easily and inexpensively made.

For reasons of chemical stability, fuel cells presently available typically use a fully fluorinated polymer such as Dupont's Nafion® as the ion-conducting membrane. This polymer is expensive to produce, which raises the cost of fuel cells to a level that renders them commercially unattractive. It is therefore a further object of this invention to produce an inexpensive ion-conducting membrane.

Membranes composed of hydrophilic polymers have been used in heating, ventilating and air conditioning systems to improve control of humidity while reducing energy costs. Systems function by allowing transfer of moisture between a humid air stream to a relatively dry one. One of the functions of a HVAC (heating/ventilation/air conditioning) system in a building is to exhaust air to the atmosphere and simultaneously replenish the exhausted air with fresh air. It is necessary to adjust the temperature of the fresh air to approximately the same temperature and humidity of the exhausted air before introducing it into the building. This requires additional cooling or warming of the fresh air and the addition or removal of moisture, at a significant energy cost. In addition, this ventilating process frequently employs moving parts in the apparatus which requires periodic maintenance. In order to minimize energy and maintenance costs, it is desirable to provide a static heat and moisture exchanging core for simultaneously and continuously effecting both heat and moisture exchange between two air streams. An inexpensive water-conducting membrane having mechanical strength is desirable in order to provide an improved operating lifetime for such cores. U.S. Pat. No. 4,051,898 to Yoshino discloses the use of Japanese paper to transfer heat and moisture between fresh intake air and exhaused room air in an HVAC system. Zhang and Jiang (*J. Membrane Sci.*, pages 29–38 (1999)) disclose an energy recovery ventilator wherein heat and water are transferred across a porous hydrophilic polymer membrane. In U.S. Pat. No. 5,348,691, McElroy et al. disclose a humidifying device wherein water is transported across a membrane composed of a perfluorocarbonsulfonic acid polymer or a polystyrenesulfonic acid. It is therefore an object of this invention to produce a membrane which allows the transfer of water between two gas streams separated by the membrane. The membrane must also be mechanically stable and free of porosity and pinholes which would allow clogging by contaminants.

Existing desalination plants are typically based on reverse osmosis membranes. These membranes are designed such that water can pass through, leaving behind salts and minerals. Due to water concentration differences between the two surfaces of the membrane, a physical assist in the form of a pressure differential is required for water to pass through the membrane. Therefore, the seawater is pressurized in order to force water through the membrane. One undesirable effect of applying pressure to the seawater is that contaminants that are too large to pass through the membrane are forced against it, reducing the efficiency of the membrane. Therefore, the membrane must be periodically backflushed or surface scoured to remove the contaminants. In order to guarantee that the reverse osmosis plant can sustain the rated potable water production, the plant must be oversized to allow for concurrent membrane flushing while still producing clean water.

The reverse osmosis process draws a considerable amount of energy to pump seawater through the membrane. The physical plant is costly due to the complexity of the piping necessary to support the pressurized operation with the necessary membrane cleaning. In addition, disposal of effluent from the plant requires that contaminants, which are concentrated by the reverse osmosis process, must be rediluted to be safely disposed of.

Therefore, there is a need for a cost-effective alternative to the reverse osmosis process for the production of potable water from brine.

SUMMARY OF THE INVENTION

In one aspect, the present invention relates to a water- and proton-conducting membrane according to the present invention comprises a sulfonated statistical copolymer. This statistical copolymer comprises an arylvinyl monomer and at least one monoolefin monomer, and aromatic moieties derived from the arylvinyl monomer are at least partially sulfonated. The statistical copolymer preferrably comprises from about 20 weight percent to about 80 weight percent arylvinyl monomer. The arylvinyl monomer is preferably styrene, vinyl toluene, or α-methylstyrene, and, more preferably, is styrene.

Aromatic moieties derived from the arylvinyl monomer preferably comprise from about 20 mole percent aromatic sulfonate to about 80 mole percent aromatic sulfonate, more preferably, from about 20 mole percent aromatic sulfonate to about 50 mole percent aromatic sulfonate, and, most preferably, from about 30 mole percent aromatic sulfonate to about 50 mole percent aromatic sulfonate.

In a preferred embodiment, the statistical copolymer comprises from about 20 weight percent to about 80 weight percent styrene. Aromatic moieties derived from styrene preferably comprise from about 20 mole percent styrene sulfonate to about 80 mole percent styrene sulfonate, more preferably, from about 20 mole percent styrene sulfonate to about 50 mole percent styrene sulfonate, and most preferably, about 30 mole percent styrene sulfonate to about 50 mole percent styrene sulfonate.

The monoolefin monomer is preferably ethylene, propylene, 1-butene, 2-butene, isobutylene, 1-pentene, 4-methyl-1-pentene, 1-hexene, or 1-octene. The statistical copolymer may additionally comprise norbornene. A preferred monoolefin monomer is ethylene. More preferably, the statisitical copolymer comprises a copolymer of styrlene and ethylene. The weight-average molecular weight ($M_w$) of the statistical copolymer is at least 20,000.

In another aspect, the present invention relates to a fuel cell comprising the water- and proton-conducting membrane described above, first and second opposed electrodes in contact with said proton conducting membrane, means for supplying a fuel to said first electrode; and means for permitting an oxidant to contact said second electrode. Preferably, at least one of said first and second electrodes comprises catalytic particles and a sulfonated statistical copolymer of styrene and ethylene as a binder. More preferably, the sulfonated statistical styrene copolymer is a sulfonated reduced statistical styrene butadiene copolymer or a sulfonated statistical styrene ethylene copolymer. The present invention also relates to a fuel cell comprising at least one humidification section for humidification of a fuel gas, said humidification section comprising a membrane having at least two opposed surfaces disposed between a fuel stream and a water-containing fluid, said membrane comprising a sulfonated statistical styrene copolymer.

In yet another aspect, the present invention relates to a method of conditioning air for an enclosure by transferring heat and moisture between a first stream of outside ambient air and a second stream of enclosure return air comprising disposing a water-conducting membrane between said first and second stream, said water-conducting membrane having at least two opposed surfaces and comprising a sulfonated statistical copolymer, the statistical copolymer comprising at least one arylvinyl monomer and at least one olefin monomer, and wherein aromatic moieties derived from the arylvinyl monomer are at least partially sulfonated; and contacting the first and second gas stream with an opposite surface of said water-conducting membrane, whereby heat and moisture are transferred from the first stream of outside ambient air to the second stream of enclosure return air. The sulfonated statistical copolymer is preferably a sulfonated reduced statistical styrene butadiene copolymer or a sulfonated statistical styrene ethylene copolymer. A heat and moisture exchanger core for transferring heat and moisture between a first stream of outside ambient air and a second stream of enclosure return air comprises a water-conducting membrane disposed between the first stream of outside ambient air and the second stream of enclosure return air, said water-conducting membrane comprising a sulfonated statistical styrene copolymer; whereby heat and moisture are transferred from the first stream of outside ambient air to the second stream of enclosure return air. An apparatus for conditioning air for an enclosure comprising a heat and moisture exchanger core for transferring heat and moisture between a first stream of outside ambient air and a second stream of enclosure return air, said heat and moisture exchanger core comprising a water-conducting membrane disposed between a first stream of outside ambient air and a second stream of enclosure return air, said water-conducting membrane comprising a sulfonated statistical copolymer, the statistical copolymer comprising at least one arylvinyl monomer and at least one olefin monomer, and wherein aromatic moieties derived from the arylvinyl monomer are at least partially sulfonated; whereby heat and moisture are transferred from the first stream of outside ambient air to the second stream of enclosure return air.

In yet another aspect, the present invention relates to a process for the desalination of brine which does not have high energy requirements, does not require pressurized operation, or periodic flushing of a membrane and does not produce a concentrated effluent for disposal. A process for extracting potable water from a brine comprises providing a membrane comprising a sulfonated arylvinyl polymer, the arylvinyl polymer comprising at least one arylvinyl monomer and wherein aromatic moieties derived from the arylvinyl monomer are at least partially sulfonated; placing a first surface of the membrane in contact with the brine; passing a gas over a second surface of the membrane, the gas being initially at least partially unsaturated with water vapor; and cooling the gas to condense liquid potable water. Preferably, the sulfonated styrene copolymer is a sulfonated styrene-ethylene-butylene-styrene triblock copolymer, a sulfonated reduced statistical styrene butadiene copolymer or a sulfonated statistical styrene ethylene copolymer. The process may additionally comprise heating the gas before passing the gas over the second surface of the membrane. The steps are preferably performed repeatedly in sequence. The gas may be heated or cooled by seawater. An apparatus for the extraction of potable water from a brine comprises a membrane comprising a sulfonated arylvinyl polymer, the arylvinyl polymer comprising at least one arylvinyl monomer and wherein aromatic moieties derived from the arylvinyl monomer are at least partially sulfonated, a first surface of said membrane contactable with the brine, and a second surface of said membrane contactable with a stream of gas, the gas being at least partially unsaturated with water vapor; a cooling surface contactable with the gas; and a warming surface contactable with the gas.

DETAILED DESCRIPTION OF THE INVENTION

Polymers prepared from vinyl monomers containing an aryl, haloaryl or alkyl-substituted aryl group ("arylvinyl monomers") may be sulfonated to produce polymers containing pendant aryl sulfonate groups. It has been unexpectedly discovered that membranes comprising such sulfonated polymers conduct both water and protons, while at the same time maintaining excellent mechanical properties. These membranes are useful in a variety of applications, but especially as proton-conducting membranes for fuel cells, and as part of a section for humidification of the fuel gas in a fuel cell; as part of a system for conditioning air for an enclosure by transferring heat and moisture between a stream of outside ambient air and a stream of enclosure return air; and as part of a system for the extraction of potable water from a brine, specifically seawater.

The polymers may be block, graft or statistical copolymers derived from arylvinyl monomers. Block and graft copolymers contain relatively long segments made up of a homopolymer derived from one of the comonomers. In contrast, the term "statistical" is used herein to refer to polymers that do not contain long segments made up of homopolymer, and to distinguish these from block and graft copolymers. Preferably, the statistical polymers do not contain more than 15 percent of the total amount of arylvinyl monomer in blocks of arylvinyl monomer of more than 3 units. More preferably, the statistical polymers are not characterized by a high degree of either isotacticity or syndiotacticity. This means that in the carbon-13 NMR spectrum of the statistical polymer the peak areas corresponding to the main chain methylene and methine carbons representing either meso diad sequences or racemic diad sequences should not exceed 75 percent of the total peak area of the main chain methylene and methine carbons.

"Statistical copolymer" is a well defined term of art (see G. Odian, "Principles of Polymerization," 1991), and the use of the term herein is consistent with the commonly understood usage. Statistical copolymers are derived from the simultaneous polymerization of two monomers and have a distribution of the two monomer units along the copolymer chain that follows Bernoullian (zero-order Markov), or first or second order Markov statistics. The polymerization may be initiated by free radical, anionic, cationic or coordinatively unsaturated (e.g., Ziegler-Natta catalysts) species. According to Ring et al., (Pure Appl. Chem., 57, 1427, 1985), statistical copolymers are the result of "elementary processes leading to the formation of a statistical sequence of monomeric units (that) do not necessarily proceed with equal probability. These processes can lead to various types of sequence distributions comprising t hose in which the arrangement of monomeric units tends toward alternation, tends toward clustering of like units, or exhibits no ordering tendency at all." Bernoullian statistics is essentially the statistics of coin tossing; copolymers formed via Bernoullian processes have the two monomers distributed randomly and are referred to as random polymers. For example, it is possible in a free radical copolymerization for the active end, in the case of one embodiment, a styryl or butadienyl radical, to have essentially no selectivity for styrene vs. butadiene. If so, the statistics will be Bernoullian, and the copolymer obtained will be random. More often than not, there will be a tendency for the propagating chain end to have some selectivity for one monomer or the other. In rare cases block copolymers can be derived from the simultaneous copolymerization of two monomers when the preference of the propagating chain ends for adding the opposite monomers is very low. The resulting polymer would be categorized as a block copolymer for the purposes of the present invention.

Statistical copolymers generally display a single glass transition temperature. Block and graft copolymers typically display multiple glass transitions, due to the presence of multiple phases. Statistical copolymers are, therefore, distinguishable from block and graft copolymers on this basis. The single glass transition temperature reflects homogeneity at the molecular level. An additional consequence of this homogeneity is that statistical copolymers, such as those of styrene and butadiene, when viewed by electron microscopy, display a single phase morphology with no microphase separation. In contrast, block and graft copolymers of styrene/butadiene, for example, are characterized by two glass transition temperatures and separation into styrene-rich domains and butadiene-rich domains. It should be noted that membranes of the invention which are produced from statistical copolymers originally having a single glass transition temperature and a single phase morphology do not necessarily exhibit a single phase morphology or a single glass transition temperature after sulfonation because of chemical changes in the polymer effected by the sulfonation, in combination with the physical changes effected by the casting processes of the invention.

Polymers which are suitable for use in the processes and apparatuses of the present invention are derived from the polymerization of arylvinyl monomers and which, therefore, contain pendant aryl or aromatic moieties. Arylvinyl monomers are defined herein as monomers that contain a vinyl group substituted with an aryl, haloaryl or alkyl-substituted aryl group. An example of a monomer containing a vinyl group substituted with an aryl is styrene, an example of a monomer containing a vinyl group substituted with an haloaryl group is chlorostyrene, and examples of monomers containing a vinyl group substituted with an alkyl-substituted aryl group are p-octylstyrene and vinyl toluene. One or more arylvinyl monomers may be copolymerized with an olefin comonomer to produced a polymer which may be sulfonated; the resulting sulfonated copolymers may be used to form the membranes of the present invention.

Suitable arylvinyl monomers which can be employed to prepare the polymers for sulfonation include, for example, those represented by the following formula:

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary arylvinyl aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, the ring halogenated styrenes, para-vinyl toluene or mixtures thereof, and the like. A more preferred arylvinyl monomer is styrene. Residues derived from vinyl toluene and chlorostyrene may be less readily sulfonated than those from styrene; therefore, it may be desirable to include utilize vinyl toluene and chlorostyrene along with arylvinyl monomers that result in residues that may be more readily sulfonated, such as styrene or α-methyl styrene, rather than as the sole arylvinyl component of the polymer. The aryl or aromatic moieties may be sulfonated at one or more positions on the aromatic rings to yield polymer chains having pendant aryl sulfonate groups.

Polymers which are suitable for use in the processes and apparatuses of the present invention comprise residues derived from at least one olefin monomer in addition to those derived from at least one arylvinyl monomer. Preferred olefin monomers include monoolefins, such as α-olefins and strained ring olefins, and diolefin monomers such as butadiene and isoprene. α-Olefins include ethylene and $C_{3-10}$ olefins having ethylenic unsaturation in the α- or 1-position, such as ethylene, propylene, butylene, and isobutylene. Suitable α-olefins include for example, α-olefins containing from 3 to about 20, preferably from 3 to about 12, more preferably from 3 to about 8 carbon atoms. Particularly suitable are ethylene, propylene, butene-1,4-methyl-1-pentene, 1-hexene or 1-octene or ethylene in combination with one or more of propylene, 1-butene, 4-methyl-1-pentene, 1-hexene or 1-octene. These α-olefins do not contain an aromatic moiety. Preferred monoolefin monomers are ethylene, propylene, 1-butene, 2-butene, 1-pentene, 4-methyl-1-pentene, 1-hexene, and 1-octene.

Preferred strained ring olefins are the various isomeric vinyl-ring substituted derivatives of cyclohexene and substituted cyclohexenes, norbornene and $C_{1-10}$ alkyl or $C_{6-10}$ aryl substituted norbornenes, including 5-ethylidene-2-norbornene. Especially suitable are 1-, 3-, and 4-vinylcyclohexene, norbornene and 5-ethylidene-2-norbornene. Simple linear non-branched α-olefins including for example, α-olefins containing from 3 to about 20 carbon atoms such as propylene, butene-1,4-methyl-1-pentene, hexene-1 or octene-1 are not examples of strained ring olefins. Preferred statistical arylvinyl polymers are ethylene/styrene, ethylene/propylenelstyrene, ethylene/styrene/norbornene, and ethylene/propylene/styrene/norbornene copolymers.

The polymer may also contain residues derived from other comonomers, for example, acrylate monomers. Copolymers derived from diolefins for example, butadiene and isoprene copolymers, may contain residual unsaturation. These are typically hydrogenated, or reduced, prior to being sulfonated.

The sulfonated copolymers described above may be blended with other sulfonated copolymers or with conventional polymers in order to form the membranes of the present invention.

The preferred composition of the polymers which are suitable for use in the processes and apparatuses of the present invention is at least 20 weight % styrene. More preferably, the copolymer contains from 20 to 50 weight % styrene, and most preferably, about 45 weight % styrene. The range of weight average molecular weight ($M_w$) of the polymer of the invention is from about 20,000 grams/mole to about 1,000,000 grams/mole, and preferably from about 50,000 grams/mole to 900,000 grams/mole. The sulfonated polymer used for the membranes of the present invention are preferably water-insoluble. Water-insoluble is defined as having a solubility of less than 0.5 grams of polymer in 100 grams of water at 100° C.

Preferred sulfonated polymers include sulfonated, block styrene-ethylene-butylene-styrene copolymers, sulfonated, reduced, statistical styrene-butadiene copolymers and sulfonated statistical styrene-ethylene copolymers. Statistical styrene-butadiene copolymers may be obtained from Goodyear; block styrene-ethylene-butylene-styrene copolymers may be obtained from Shell and statistical styrene-ethylene copolymers (ethylene styrene interpolymers) may be obtained from Dow Chemical.

The statistical copolymers include the pseudo-random interpolymers as described in EP-A-0,416,815 by James C. Stevens et al. and U.S. Pat. No. 5,703,187 by Francis J. Timmers, both of which are incorporated herein by reference in their entirety. The statistical polymers can be prepared by polymerizing a mixture of polymerizable monomers in the presence of one or more metallocene or constrained geometry catalysts in combination with various cocatalysts. Preferred operating conditions for such polymerization reactions are pressures from atmospheric up to 3000 atmospheres and temperatures from –30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the statistical polymers are disclosed in U.S. application Ser. No. 702,475, filed May 20, 1991 (EP-A-514,828); as well as U.S. Pat. Nos. 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185 all of which patents and applications are incorporated herein by reference.

The statistical α-olefin/arylvinyl copolymers can also be prepared by the methods described in JP 07/278230 employing compounds shown by the general formula where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$.

The statistical a-olefin/arylvinyl copolymers can also be prepared by the methods described by John G. Bradfute et al. (W. R. Grace & Co.) in WO 95/32095; by R. B. Pannell (Exxon Chemical Patents, Inc.) in WO 94/00500; and in Plastics Technology, p. 25 (September 1992), all of which are incorporated herein by reference in their entirety.

Also suitable are the statistical polymers which comprise at least one α-olefin/vinyl aromatic/vinyl aromatic/α-olefin tetrad disclosed in U.S. application Ser. No. 08/1708,869 filed Sep. 4, 1996 and WO 98/09999 both by Francis J. Timmers et al., the entire contents of both of which are herein incorporated by reference. These copolymers contain additional signals in their carbon-13 NMR spectra with intensities greater than three times the peak to peak noise. These signals appear in the chemical shift range 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

Further preparative methods for the statistical copolymers used in the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienylti­tanium trichloride ($CpTiCl_3$) to prepare an ethylene-styrene copolymer. Xu and Lin (*Polymer Preprints, Am. Chem. Soc., Div. Polym. Chem.*) Volume 35, pages 686,687 [1994]) have reported copolymerization using a $MgCl_2/TiCl_4/NdCl_3/Al$ $(iBu)_3$ catalyst to give random copolymers of styrene and propylene. Lu et al (*Journal of Applied Polymer Science*, Volume 53, pages 1453 to 1460 [1994]) have described the copolymerization of ethylene and styrene using a $TiCl_4/NdCl_3/MgCl_2/Al(Et)_3$ catalyst. Sernetz and Mulhaupt, (*Macromol. Chem. Phys.*, v. 197, pp. 1071–1083, 1997) have described the influence of polymerization conditions on the copolymerization of styrene with ethylene using $Me_2Si$ $(Me_4Cp)(N\text{-tert-butyl})TiCl_2$/methylaluminoxane Ziegler-Nafta catalysts. Copolymers of ethylene and styrene pro­duced by bridged metallocene catalysts have been described by Arai, Toshiaki and Suzuki (*Polymer Preprints, Am. Chem. Soc., Div. Polym. Chem.*) Volume 38, pages 349, 350 [1997]) and in U.S. Pat. No. 5,652,315, issued to Mitsui Toatsu Chemicals, Inc. The manufacture of α-olefin/vinyl aromatic monomer copolymers such as propylene/styrene and butene/styrene are described in U.S. Pat. No. 5,244,996, issued to Mitsui Petrochemical Industries Ltd or U.S. Pat. No. 5,652,315 also issued to Mitsui Petrochemical Indus­tries Ltd or as disclosed in DE 197 11 339 A1 and U.S. Pat. No. 5,883,213 to Denki Kagaku Kogyo KK. All the above methods disclosed for preparing the statistical copolymer component are incorporated herein by reference. Also, although of high isotacticity and therefore not "statistical", the random copolymers of ethylene and styrene as disclosed in Polymer Preprints Vol 39, No.1, March 1998 by Toru Aria et al. can also be employed as blend components for the foams of the present invention.

While preparing the statistical copolymers, an amount of atactic arylvinyl homopolymer may be formed due to homopolymerization of the arylvinyl monomer at elevated temperatures. The presence of arylvinyl homopolymer is in general not detrimental for the purposes of the present invention and can be tolerated. The arylvinyl homopolymer may be separated from the copolymer, if desired, by extrac­tion techniques such as selective precipitation from solution with a non solvent for either the copolymer or the arylvinyl homopolymer. For the purpose of the present invention it is preferred that no more than 30 weight percent, preferably less than 20 weight percent based on the total weight of the copolymers of atactic arylvinyl homopolymer is present.

Where diolefins are used as comonomers, the unsaturated residues in the copolymer membranes of the invention are typically selectively hydrogenated prior to sulfonation of aromatic groups derived from the styrene residues. The amount of unsaturation remaining after hydrogenation is less than 5 percent of the starting level of unsaturation, and preferably less than 3 percent of the original. Statistical copolymers of styrene and butadiene, also known as styrene-butadiene rubber, or SBR may be used. The copolymer may be hydrogenated by methods known in the art, such as hydrogen gas in the presence of catalysts such as Raney Nickel, and platinum or palladium metals. The diimide reduction described in the examples may also be employed to produce materials which are useful as ion-conducting membranes. Hydrogenated statistical copolymers of styrene and butadiene are also commercially available. Oxidation of residual unsaturated sites in the polymer at levels greater than 5 percent unsaturation leads to degradation of the polymer and shortens the useful life of the membrane under operating conditions.

The hydrogenation level may be determined by the method of Parker et al. An FTIR spectrum of a hydrogenated styrene butadiene copolymer is analyzed by measuring the heights of the peaks at 963 $cm^{-1}$ and 1493 $cm^{-1}$, corre­sponding to the absorbance of =CH and —$CH_2$, respec­tively. The percent hydrogenation is calculated using the following equation:

$$\% \text{ hydrogenation} = -15.71x + 99.4$$

where x=the ratio of the peak height at 963 $cm^{-1}$ to the peak height at 1493 $cm^{-1}$ The sulfonated polymers useful as the membranes of the present invention are prepared by sulfonation of the aro­matic ring with an acyl sulfate sulfonation agent. Sulfona­tion of hydrogenated block copolymers of styrene and butadiene is known in the art as described in U.S. Pat. No. 5,239,010 (Balas et al.), which relates to a thermoplastic elastomer composition. The sulfonation method of the invention differs from methods described by others in the art in that much higher levels of sulfonation have been achieved. The highest level of sulfonation disclosed by others in the art is approximately 25 mol %, whereas the statistical copolymers of the present invention have been sulfonated up to about 80 mol %.

The preferred level of sulfonic acid functionality ranges from about one functional group per five aromatic rings (20 mol %) to about four functional groups per five aromatic rings (80 mol %), such that the equivalent weight of the resulting sulfonated polymer is from about 300 grams/sulfonate equivalent to about 1400 grams/sulfonate equiva­lent. For example, for a copolymer of 45 weight percent styrene, the preferred range is between one sulfonic acid group per five styrene units (20 mol %, equivalent weight= 1200 grams/equivalent) to about four sulfonic acid group per five styrene units (80 mol %, equivalent weight=300 grams/equivalent). For a copolymer of 30 weight percent styrene, the preferred range is between one sulfonic acid group per four styrene units (25 mol %, equivalent weight=1400 grams/equivalent) to four sulfonic acid groups per five styrene units (80 mol %, equivalent weight=430 grams/equivalent). The sulfonation level of the polymer may be controlled by the stoichiometric ratio of the sulfonating agent, acetyl sulfate, to the styrene content of the polymer. For example, addition of 1.0 equivalents of acetyl sulfate yields a polymer of 32 mol % sulfonation and 1.4 equiva­lents yields 44 mol % sulfonation.

The sulfonation process of the invention is described in the examples below. Other routes to the sulfonation of polystyrene are known in the art, including the use of sulfur trioxide ($SO_3$) complexes with a number of agents such as phosphorus pentoxide, triethyl phosphate and tris (2-ethylhexyl) phosphate. Preformed acyl sulfates, including sulfuric acid/acetic anhydride, sulfur trioxide/acetic acid, sulfur trioxide/lauric acid, and chlorosulfonic acid/lauric acid have also been employed. In addition, chlorosulfonic acid and trimethylsilyl-sulfonyl chloride have been found useful. Each requires hydrolysis to obtain the desired sulfonic acid. The preferred sulfonation agent of the present invention is acetyl sulfate. It may be prepared by reacting acetic anhydride with sulfuric acid at 0° C. The solvent for the sulfonation reaction is one in which the copolymer remains soluble and not excessively viscous. The solvent should also be one in which the sulfonation agent does not react with the solvent system itself. A halogenated solvent is usually preferred, for example, dichloroethane (DCE) or methylene chloride.

After the reaction is complete, the reaction mixture may then be dissolved in a solvent which is appropriate for forming a polymer solution. The solvent used should allow a uniform film of sufficient conductivity to be formed. The room temperature ionic conductivity of a fully hydrated membrane, as measured by ac impedance analysis, must be at least $10^{-3}$ S/cm. Various polar solvents are usually suitable for this purpose when sulfonated styrene copolymers are used. Examples are ethanol, propanol, butanol, and pentanol, with n-propanol often preferred. A portion of the initial solvent(s) used is then usually removed to obtain a viscous liquid. A high-solids solution is desirable in order to minimize materials and processing costs. However, at high solids levels, approximately above 20% polymer, the polymer may not be fully soluble and can form a gel. Therefore, the solution is preferably concentrated to about 10% solids.

A film of the sulfonated reduced copolymer is then cast on a substrate to form a membrane. Techniques for casting the material which will form the ion-conducting membrane of the present invention are known in the art. A particular technique is not critical, and an exemplary procedure is as follows: Determine the weight % solids of a polymer solution by weighing about 3 grams into an aluminum pan (56 to 70 mm in diameter), and then heating at about 45–50° C until the polymer solution is completely dried and reweighing the pan. Record the weight of the casting dish. Measure the surface area (in square centimeters) of the casting dish and multiply by 0.025 cm. This provides the total volume of the final film (assuming the density of the polymer is approximately equal to 1 gram/$cm^3$). Divide the total volume by the weight % solids. This provides the total weight of polymer solution to be used for casting a film. Weigh the polymer solution into an 8 dram vial and pour into the casting dish (a slight excess, approximately 0.7 grams, should be weighed to account for material sticking to the sides of the vial). The casting dish should be placed on a level surface. After all the solvent has evaporated, weigh the casting dish with the dried film and divide by the initial polymer solution weight (this provides a check on the initial weight % solids). Then, hydrate the film by filling the casting dish with water. Decant the excess water and refill the dish at least three times to remove any water-soluble material. Remove the film from the dish and allow it to air-dry on a piece of Teflon®.

Films cast from the above solutions display low water uptake. Films of sulfonated statistical copolymers absorb about 40% less water than those of corresponding block copolymers of similar equivalent weight. For example, the water uptake of a sulfonated hydrogenated block copolymer of styrene and butadiene with an equivalent weight of 580 grams/equivalent was 360% while that of a sulfonated hydrogenated SBR with an equivalent weight of 540 grams/equivalent was only 230%. The lower water uptake in the sulfonated copolymer when compared to the corresponding block copolymer correlates with greater strength of the statistical copolymer than block copolymers. The increase in film strength results in a potentially longer life for the fuel cell membrane.

Membranes according to the present invention comprising a sulfonated statistical copolymer, the copolymer comprising at least one arylvinyl monomer and at least one monoolefin monomer, are useful as part of a fuel cell. A preferred arylvinyl monomer is styrene; a referred monoolefin monomer is ethylene. Preferred sulfonated polymers are sulfonated, block styrene-ethylene-butylene-styrene copolymers; sulfonated, reduced, statistical styrene-butadiene copolymers and sulfonated statistical styrene-ethylene copolymers.

Figure 1:
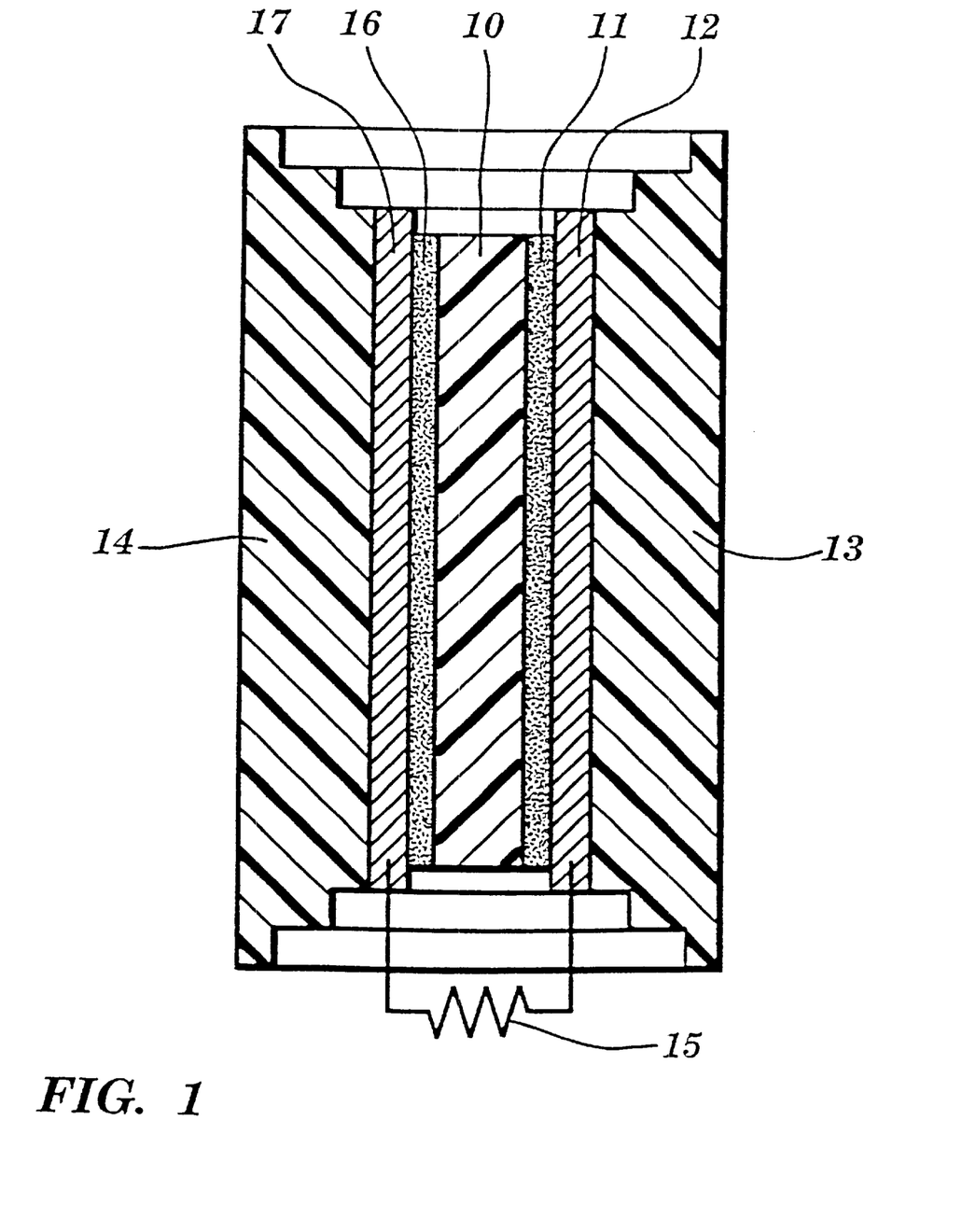
FIG. 1 is a schematic diagram of a typical fuel cell incorporating a membrane according to the present invention.

A typical fuel cell according to the present invention is shown in FIG. 1. It comprises an ion-conducting membrane 10, a catalyst electrode 11, current collector 12 and oxidant manifold 13. On the opposite side of the membrane 10 are a second catalyst electrode 16, a second current collector 17, and a fuel manifold 14.

Its operation as a fuel cell is described as follows with hydrogen as the fuel, but any oxidizable fuel could be used. Hydrogen is fed into the fuel manifold 14. Hydrogen reacts with catalyst electrode 16 to form protons. The electrons which are formed by the interaction of the hydrogen and catalyst in the hydrogen electrode are collected by the hydrogen current collector 17 and fed into the external electrical load 15. The protons are absorbed by the ion-conducting membrane 10. Oxygen is fed into the oxidant manifold 13. The oxygen reacts with the catalyst in the oxygen electrode and the electrons returning from the external electrical load 15 through the oxygen current collector 12 to form oxygen anions within the catalyst electrode 11. Protons from the ion-conducting membrane 10 seek out the oxygen anions driven by the electrical potential created by the formation of the oxygen anions. Protons combine with the oxygen anions to form water in the oxygen electrode completing the electrochemical circuit. The water is released by the electrode 11 and removed from the cell through the manifold 12.

The fuel cell may incorporate a section for humidification of the fuel gas, in order to counteract drying of the proton-conducting membrane that typically occurs during operation. Exemplary fuel cells containing such a humidification section are described by Reiser (U.S. Pat. No. 4,769,297), Vanderborgh (U.S. Pat. No. 4,973,530), and Chow (U.S. Pat. No. 5,382,478), the disclosures of which are incorporated by reference in their entirety. A fuel cell containing a humidification section according to the present invention comprises a membrane having at least two opposed surfaces disposed between a fuel stream and a water-containing fluid. The membrane is composed of a sulfonated statistical polymer, preferably a sulfonated statistical reduced styrene-butadiene copolymer or a sulfonated statistical styrene-ethylene copolymer.

Membranes according to the present invention conduct water and also heat, while, at the same time, maintaining good mechanical strength and stability. Where the membrane comprises a sulfonated statistical copolymer, the copolymer comprising an aryl vinyl monomer and at least one olefin monomer, the membrane is useful as part of a static heat and moisture exchanger core in an HVAC system or energy recovery ventilator. A preferred arylvinyl monomer in this context is styrene; a preferred olefin monomer is ethylene. Preferred sulfonated polymers are sulfonated, reduced, statistical styrene-butadiene copolymers and sulfonated statistical styrene-ethylene copolymers. Air for an enclosure is conditioned by transferring heat and moisture between a first stream of outside ambient air and a second stream of enclosure return air. The membrane is disposed between the fresh air and exhaust air streams, and functions by transferring heat and moisture from the one stream of air to the other.

Figure 2:
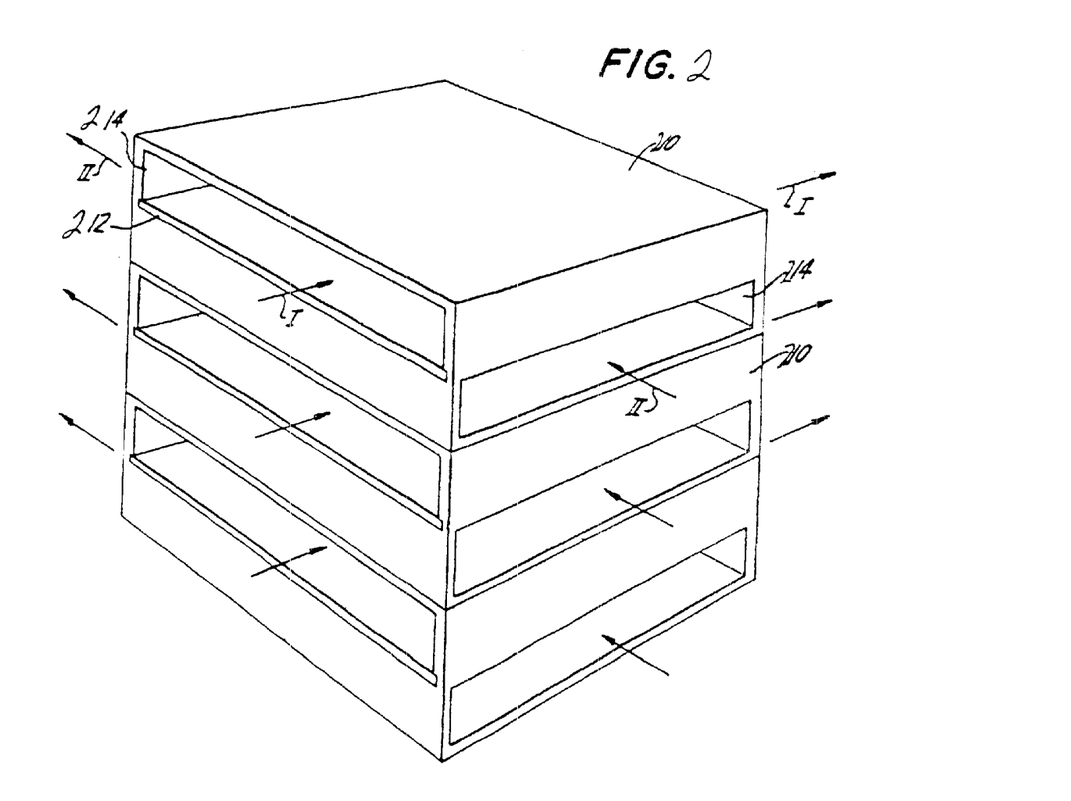
FIG. 2 is a perspective view of a multi layer heat and moisture exchanging core composed of a plurality of single heat and moisture exchanging units that incorporate a membrane comprising a sulfonated statistical polymer.

An exemplary heat and moisture exchanging core according to the present invention is shown in FIG. 2. The heat and moisture exchanging core comprises a shell structure 210 divided into a plurality of separate and alternately crossing flow paths 214 by a series of superposed and spaced-apart heat and moisture exchanging members 212. Each member comprises a sulfonated polymer which conducts both heat and moisture between the air streams flowing through alternate flow paths I and II without interrupting the flow of either air stream.

Figure 3:
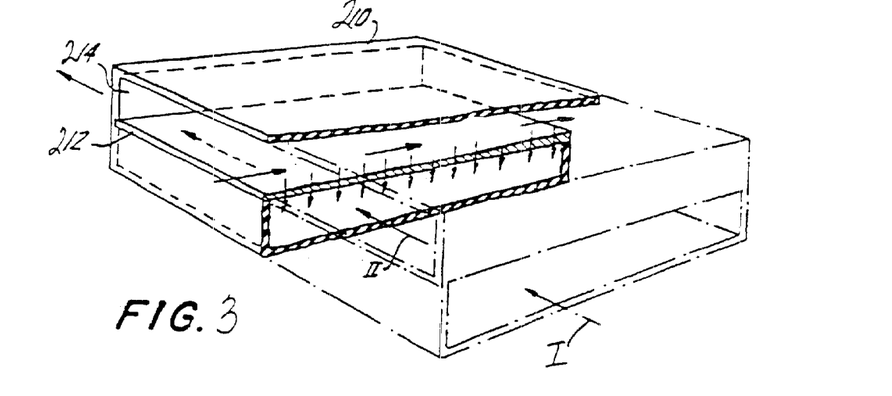
FIG. 3 is a perspective view of a single unit of the heat and moisture exchanging core, with the front half thereof broken away and illustrated in phantom, showing moisture transfer between two streams of air.

FIG. 3 illustrates a single unit of the heat and moisture exchanging core of the present invention. The arrangement illustrated in FIG. 3 is the most fundamental unit embodying the principles of the invention and comprises a hollow self-contained box-shaped shell structure 210 having a rectangular cross-section. The shell structure 210 may be formed of any suitable material, synthetic resin or metal.

In one embodiment (air conditioning), warm, moist outside air is supplied to one flow path I. As the air passes through flow path I, moisture is removed from the air. At the same time, enclosure or room return air is withdrawn from the room and passes through flow path II. This return air is cooler and drier than the outside air. Moisture removed from the outside air passes through the membrane and is picked up by the return air, which is exhausted to the outside. In addition, heat is transferred through the membrane, decreasing the temperature of the outside air stream. From core 212, the cooled and dehumidified stream of air passes to an air conditioner. Because the air has been dried, it is possible to operate the air conditioner unit at a higher temperature.

While operation of the system in cooling outside air has been described above, the system may be used to heat and humidify cold outside air in winter. In this case, heat and moisture is transferred to the outside air before the air is passed through a heater. In this way, heat and humidity is maintained in the building, and costs for operating the heater are lower.

Desalination processes according to the present invention are based on a membrane composed of a sulfonated polymer. The polymer may be a statistical, block or graft copolymer comprising an aryl vinyl monomer and at least one olefin monomer. Preferred sulfonated polymers are sulfonated, block styrene-ethylene-butylene-styrene copolymers; sulfonated, reduced, statistical styrene-butadiene copolymers and sulfonated statistical styrene-ethylene copolymers. The membrane is disposed between a brine reservoir and a stream of a gas that is at least partially unsaturated with water vapor. Brine is an aqueous solution of any salt or mixture of salts, and may include other components which are dissolved or dispersed in the solution. In a preferred embodiment, seawater is used as the brine. Gases typically used are nitrogen and air. One surface of the membrane is in contact with the brine, while the other surface is in contact with the gas stream. On the one side, the membrane absorbs the brine along with dissolved salts and other components of the brine. On the other side, contact with the unsaturated gas causes water vapor to evaporate from the membrane.

Salts and other components carried by the brine are left behind in the membrane when the water evaporates. These materials passively back-diffuse into the brine because of the lower concentration of these materials in the brine. Absorption of new water to replace the water lost by evaporation and back-diffusion of contaminants occurs concurrently.

The operation of conventional reverse osmosis (RO) systems has been described by O.K. Buros in "ABC's of Desalting", published by IDA Publications as follows:

"RO is a membrane separation process in which the water from a pressurized saline solution is separated from the solutes (the dissolved material) by flowing through a membrane. No heating or phase change is necessary for this separation. The major energy required for desalting is for pressurizing the feed water.

In practice, the saline feed water is pumped into a closed vessel where it is pressurized against the membrane. As a portion of the water passes through the membrane, the remaining feed water increases in salt content. At the same time, a portion of this feed water is discharged without passing through the membrane.

Without this controlled discharge, the pressurized feed water would continue to increase in salt concentration, creating such problems as precipitation of supersaturated salts and increased osmotic pressure across the membranes. The amount of the feed water discharged to waste in this brine stream varies from 20 to 70 percent of the feed flow, depending on the salt content of the feed water.

An RO system is made up of the following basic components:

Pretreatment

High-pressure pump

Membrane assembly

Post-treatment

Pretreatment is important in RO because the feed water must pass through very narrow passages during the process. Therefore, suspended solids must be removed and the water pre-treated so that salt precipitation or microorganism growth does not occur on the membranes. Usually the pretreatment consists of fine filtration and the addition of acid or other chemicals to inhibit precipitation.

The high-pressure pump supplies the pressure needed to enable the water to pass through the membrane and have the salts rejected. This pressure ranges from 17 to 27 bar (250 to 400 psi) for brackish water and from 54 to 80 bar (800 to 1180 psi) for sea water.

The membrane assembly consists of a pressure vessel and a membrane that permits the feed water to be pressurized against the membrane. The membrane must be able to withstand the drop of the entire pressure across it. The semi-permeable membranes are fragile and vary in their ability to pass fresh water and reject the passage of salts. No membrane is perfect in its ability to reject salts, so a small amount of salts passes through the membrane and appears in the product water.

RO membranes are made in a variety of configurations. Two of the most commercially successful are spiral-wound and hollow fine fiber. Both of these configurations are used to desalt both brackish and sea water, although the construction of the membrane and pressure vessel will vary depending on the manufacturer and expected salt content of the feed water.

Post-treatment consists of stabilizing the water and preparing it for distribution. This post-treatment might consist of the removing gases such as hydrogen sulfide and adjusting the pH."

Figure 4:
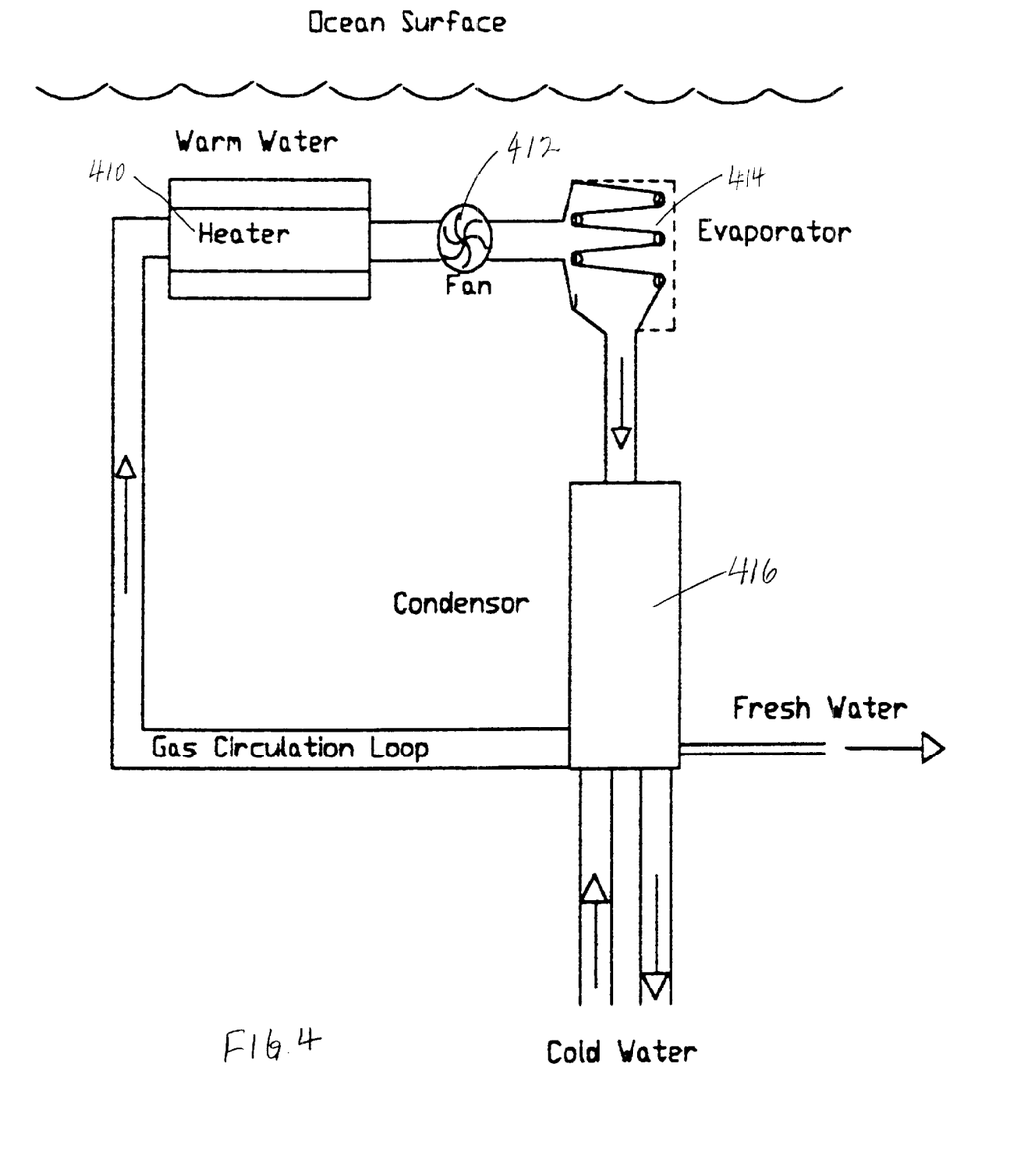
FIG. 4 is a schematic diagram of a desalination process according to the present invention.

Energy efficient evaporation and condensation of the water on a large scale is typically accomplished using ocean water as both heating and cooling source. A considerable temperature differential generally exists between water at the surface of the ocean, to a depth of about one meter, and water at deeper levels. The temperature difference can be as much as twenty degrees Celsius. A schematic view of the process is depicted in FIG. 4. A stream of gas is equilibrated to the temperature of the warmer water by heater 410. Fan 412 circulates the warm gas over the membrane in evaporator 414 and the gas becomes saturated with water vapor. Exemplary gases for use in the process of the present invention are nitrogen and air, but essentially any non-toxic gas which is inert toward water and the membrane may be used. The water-saturated gas is then directed over condenser 416 which is cooled with water from deeper levels of the ocean to condense the water vapor to liquid potable water. The potable water is pumped onshore to be used. The cool, dry gas is circulated back to heater 410, reequilibrated to the temperature of the water in the upper layer, and circulated back to the membrane in evaporator 414 to be resaturated with water vapor. A continuously-operating gas circulation loop such as this can provide a constant supply of potable water at a low cost.

EXAMPLES

The following examples are provided to illustrate the present invention. The examples are not intended to limit the scope of the present invention and they should not be so interpreted. Amounts are in weight parts or weight percentages unless otherwise indicated.

1. Preparation of Ethylene/Styrene Statistical Copolymers (Interpolymers) (ESI) 40/60 wt % E/S A statistical copolymer was prepared in a continuously operating loop reactor (36.8 gal). Catalyst, cocatalyst and conditions used in the polymerization process are summarized in Table 1. An Ingersoll-Dresser twin screw pump provided the mixing. The reactor ran liquid full at 475 psig (3,275 kPa) with a residence time of approximately 25 minutes. Raw materials and catalyst/cocatalyst flows were fed into the suction of the twin screw pump through injectors and Kenics static mixers. The twin screw pump discharged into a 2 inch diameter line which supplied two Chemineer-Kenics 10-68 Type BEM Multi-Tube heat exchangers in series. The tubes of these exchangers contained twisted tapes to increase heat transfer. Upon exiting the last exchanger, loop flow returned through the injectors and static mixers to the suction of the pump. Heat transfer oil was circulated through the exchangers' jacket to control the loop temperature probe located just prior to the first exchanger. The exit stream of the loop reactor was taken off between the two exchangers. The flow and solution density of the exit stream was measured by a Micro-Motion™ mass flow meter.

Solvent feed to the reactor was supplied by two different sources. A fresh stream of toluene from an 8480-S-E Pulsafeeder™ diaphragm pump with rates measured by a Micro-Motion™ mass flow meter was used to provide flush flow for the reactor seals (20 lb/hr (9.1 kg/hr). Recycle solvent was mixed with uninhibited styrene monomer on the suction side of five 8480-5-E Pulsafeeder™ diaphragm pumps in parallel. These five Pulsafeeder™ pumps supplied solvent and styrene to the reactor at 650 psig (4,583 kPa). Fresh styrene flow was measured by a Micro-Motion™ mass flow meter, and total recycle solvent/styrene flow was measured by a separate Micro-Motion™ mass flow meter.

Ethylene was supplied to the reactor at 687 psig (4,838 kPa). The ethylene stream was measured by a Micro-Motion™ mass flow meter. A Brooks flow meter/controller was used to deliver hydrogen into the ethylene stream at the outlet of the ethylene control valve.

The ethylene/hydrogen mixture combined with the solvent/styrene stream at ambient temperature. The temperature of the entire feed stream as it entered the reactor loop was lowered to 2° C. by an exchanger with −10° C. glycol on the jacket. Preparation of the three catalyst components took place in three separate tanks. Fresh solvent and concentrated catalyst/cocatalyst premix were added and mixed into their respective run tanks and fed into the reactor via variable speed 680-S-AEN7 Pulsafeeder™ diaphragm pumps. As previously explained, the three component catalyst system entered the reactor loop through an injector and static mixer into the suction side of the twin screw pump. The raw material feed stream was also fed into the reactor loop through an injector and static mixer downstream of the catalyst injection point but upstream of the twin screw pump suction.

Polymerization was stopped with the addition of catalyst kill (water mixed with solvent) into the reactor product line after the Micro-Motion™ mass flow meter measuring the solution density. A static mixer in the line provided dispersion of the catalyst kill and additives in the reactor effluent stream. This stream next entered post reactor heaters that provided additional energy for the solvent removal flash. This flash occurred as the effluent exited the post reactor heater and the pressure was dropped from 475 psig (3,275 kPa) down to 450 mmHg (60 kPa) of absolute pressure at the reactor pressure control valve.

This flashed polymer entered the first of two hot oil jacketed devolatilizers. The volatiles flashing from the first devolatizer were condensed with a glycol jacketed exchanger, passed through the suction of a vacuum pump, and were discharged to the solvent and styrene/ethylene separation vessel. Solvent and styrene were removed from the bottom of this vessel as recycle solvent while ethylene exhausted from the top. The ethylene stream was measured with a Micro-Motion™ mass flow meter. The measurement of vented ethylene plus a calculation of the dissolved gases in the solvent/styrene stream were used to calculate the ethylene conversion. The polymer and remaining solvent separated in the devolatilizer was pumped with a gear pump to a second devolatizer. The pressure in the second devolatizer was operated at 5 mmHg (0.7 kPa) absolute pressure to flash the remaining solvent. This solvent was condensed in a glycol heat exchanger, pumped through another vacuum pump, and exported to a waste tank for disposal. The dry polymer (<1000 ppm total volatiles) was pumped with a gear pump to an underwater pelletizer with 6-hole die, pelletized, spin-dried, and collected in 1000 lb boxes.

The polymer produced contained 77.4 wt % (47.9 mol %) styrene, with 7.8 wt % atactic styrene.

TABLE 1

| Preparation Conditions for ESI | |
|---|---|
| Reactor Temp, ° C. | 57 |
| Solvent Flow, lb/hr | 328 |
| Ethylene Flow, lb/hr | 34 |
| Hydrogen Flow, sccm | 98 |
| Styrene Flow, lb/hr | 252 |
| Ethylene Conversion, % | 97.8 |
| B/Ti Ratio | 4.0 |

TABLE 1-continued

Preparation Conditions for ESI

| MMAO/Ti Ratio | 8.0 |
|---|---|
| Catalyst | B |
| Co-Catalyst | D |

Catalyst B is (1H-cyclopenta[l]phenanthrene-2-yl)dimethyl (t-butylamido)-silanetitanium 1,4-diphenylbutadiene), prepared as in International Application, Publication No. WO 99/64500, International Application No. PCT/US99/11429. Cocatalyst D is tris(pentafluorophenyl)borane, (CAS#001109-15-5). MMAO is a modified methylaluminoxane commercially available from Akzo Nobel as MMAO-3A (CAS#146905-79-5).

The properties of the polymers and compositions were determined by the following test procedures.

Styrene Analyses

Copolymerized styrene content and the concentration of atactic polystyrene homopolymer impurity in the ESI interpolymers was determined using proton nuclear magnetic resonance ($^1$H NMR). All proton NMR samples were prepared in 1,1,2,2-tetrachloroethane-$d_2$ (tce-$d_2$). The resulting solutions contained approximately 1–3 weight percent polymer. The interpolymers were weighed directly into 5-mm sample tubes. A 0.75-mi aliquot of tce-$d_2$ was added by syringe and the tube sealed with a tight-fitting cap. The samples were heated at 85° C. to soften the interpolymer. To provide mixing, the capped samples were occasionally brought to reflux using a heat gun.

Proton NMR spectra were accumulated with the sample probe at 80° C., and referenced to the residual protons of tce-$d_2$ at 5.99 ppm. Data was collected in triplicate on each sample using the following instrumental conditions:

Sweep width, 5000 hz
Acquisition time, 3.002 sec
Pulse width, 8 msec
Frequency, 300 mhz
Delay, 1 sec
Transients, 16

The total analysis time per sample was about 10 minutes.

Initially, a spectrum for a sample of polystyrene (192,000 $M_w$) was acquired. Polystyrene has five different types of protons that are distinguishable by proton NMR. These protons are labeled b, branch; a, alpha; o, ortho; m, meta; p, para, in the structure below. For each repeating unit in the polymer, there are one branch proton, two-alpha protons, two ortho protons, two meta protons and one para proton.

The NMR spectrum for polystyrene homopolymer includes a resonance centered around a chemical shift of about 7.1 ppm, which is believed to correspond to the three ortho and para protons. The spectrum also includes another peak centered around a chemical shift of about 6.6 ppm. That peak corresponds to the two meta protons. Other peaks at about 1.5 and 1.9 ppm correspond to the three aliphatic protons (alpha and branch).

The relative intensities of the resonances for each of these protons were determined by integration. The integral corresponding to the resonance at 7.1 ppm was designated $PS_{7.1}$ below. That corresponding to the resonance at 6.6 ppm was designated $PS_{6.6}$, and that corresponding to the aliphatic protons (integrated from 0.8–2.5 ppm) was designated $PS_{al}$. The theoretical ratio for $PS_{7.1}$:$PS_{6.6}$:$PS_{al}$ is 3:2:3, or 1.5:1:1.5. For atactic polystyrene homopolymer, all spectra collected had the expected 1.5:1:1.5 integration ratio. An aliphatic ratio of 2 to 1 is predicted based on the protons labeled a and b respectively in the structure. This ratio was also observed when the two aliphatic peaks were integrated separately. Further, the ratio of aromatic to aliphatic protons was measured to be 5 to 3, as predicted from theoretical considerations.

The $^1$H NMR spectrum for the ESI interpolymer was then acquired. This spectrum showed resonances centered at about 7.1 ppm, 6.6 ppm and in the aliphatic region. However, the 6.6 ppm peak was relatively much weaker for the ESI interpolymer than for the polystyrene homopolymer. The relative weakness of this peak is believed to occur because the meta protons in the ESI copolymer resonate in the 7.1 ppm region. Thus, the only protons that produce the 6.6 ppm peak are meta protons associated with atactic polystyrene homopolymer that is an impurity in the ESI. The peak centered at about 7.1 ppm thus includes ortho, meta and para protons from the aromatic rings in the ESI interpolymer, as well as the ortho and para protons from the aromatic rings in the polystyrene homopolymer impurity. The peaks in the aliphatic region include resonances of aliphatic protons from both the ESI interpolymer and the polystyrene homopolymer impurity.

Again, the relative intensities of the peaks were determined by integration. The peak centered around 7.1 ppm is referred to below as $I_{7.1}$, that centered around 6.6 ppm is $I_{6.6}$ and that in the aliphatic regions is $I_{al}$.

$I_{7.1}$ includes a component attributable to the aromatic protons of the ESI interpolymer and a component attributable to the ortho and para protons of the aromatic rings of the polystyrene homopolymer impurity. Thus, $$I_{7.1}=I_{c7.1}+I_{ps7.1}$$

where $I_{c7.1}$ is the intensity of the 7.1 ppm resonance attributable to the aromatic protons in the interpolymer and $I_{ps7.1}$ is the intensity of the 7.1 ppm resonance attributable to the ortho and meta protons of the polystyrene homopolymer.

From theoretical considerations, as confirmed by the $^1$H NMR spectrum of the polystyrene homopolymer, the intensity of the 7.1 ppm resonance attributable to the polystyrene homopolymer impurity ($I_{ps7.1}$), equals 1.5 times the intensity of the 6.6 ppm resonance. This provides a basis for determining $I_{c7.1}$ from measured values, as follows:

$$I_{c7.1}=I_{7.1}-1.5(I_{6.6}).$$

Similarly, $I_{al}$ can be resolved into resonances attributable to the ESI and the polystyrene homopolymer impurity using the relationship $$I_{al}=I_{cal}+I_{psal}$$

wherein $I_{cal}$ is the intensity attributable to the aliphatic protons on the interpolymer and $I_{psal}$ is the intensity attributable to the aliphatic protons of the polystyrene homopolymer impurity. Again, it is known from theoretical considerations and the spectrum from the atactic polystyrene homopolymer that $I_{psal}$ will equal 1.5 times $I_{6.6}$. Thus the following relationship provides a basis for determining $I_{cal}$ from measured values:

$I_{cal} = I_{af} - 1.5(I_{6.6})$.

The mole percent ethylene and styrene in the interpolymer are then calculated as follows:

$S_c = I_{c7.1}/5$ $e_c = (I_{caf} - (3 \times s_c))/4$ $E = e_c/(s_c + e_c)$, and $S = s_c/(s_c + e_c)$, wherein E and S are the mole fractions of copolymerized ethylene and styrene, respectively, contained in the interpolymer. Weight percent ethylene and styrene were calculated using the equations $$\text{Wt \% } E = \frac{100\% * 28E}{(28E + 104S)} \text{ and}$$

$$\text{Wt \% } S = \frac{100\% * 104S}{(28E + 104S)}.$$

The weight percent of polystyrene homopolymer impurity in the ESI sample was then determined by the following equation:

$$\text{Wt \% } PS = \frac{100\% * \text{Wt \% } S * (I_{6.6}/2S)}{100 - [\text{Wt \% } S * (I_{6.6}/2S)]}.$$

The total styrene content was also determined by quantitative Fourier transform infrared spectroscopy (FTIR).

2. Sulfonation Procedure for 60 wt-% Styrene-40 wt-% Ethylene Interpolymer (ESI)

A statistical Styrene Ethylene copolymer (60 S/40 E) (120 grams) prepared in a similar manner to that of Example 1 was dissolved in 2410 grams of 1,2-dichloroethane (DCE) over about 24 hours at 40° C. A sulfonating agent was prepared by adding acetic anhydride (163.3 ml) to 337 grams DCE at reduced temperature. After 10 minutes, $H_2SO_4$ (61.5 ml) was added; after 20 minutes, the solution was warmed to approximately room temperature, over about 20 minutes.

The sulfonating agent was used immediately. The sulfonating agent solution (0.45 L) was added gradually to the polymer solution which had been purged with dry nitrogen at 49±0.5° C. The temperature was maintained at 48° C.±0.5° C. for about 1.5 hours, while purging with dry nitrogen. The reaction was quenched with n-propanol (1 L). A clear, pale yellow solution was obtained, which was filtered using a pressure filter. The solution was concentrated to about 7 to 8 wt % by rotary evaporation at 60° C. and 21 mm Hg.

The solid polymer was isolated by solvent evaporation in a fume hood, and was subsequently extracted with deionized water until the pH of the solution was about 6.5. The aqueous polymer was dried at room temperature in a well ventilated area to yield about 140 grams of a sulfonated styrene ethylene copolymer. The sulfonation level of the polymer was determined by titrating a dry weight of film against a standardized base to an endpoint. After about 20 minutes, additional base was added to the solution until an endpoint that remained for 20 minutes was reached. The sulfonation level of the polymer was 58 mol %. The viscosity of the polymer solution was 400 cps (Brookfield Spindle, #1, 12 rpm, 25° C.).

3. ESI Membrane Preparation

A membrane composed of the above 60 wt % Styrene/40 wt % Ethylene statistical copolymer, sulfonated to about 58 mol %, was prepared by cutting the polymer into very fine slices. The dry polymer was dissolved in n-propanol to form a 9.1 wt % polymer solution. A film was cast from the solution on a polyethylene sheet to form the membrane.

4. Effect of Sulfonation Level on Water Uptake and Ionic Conductivity

The sulfonation process described above was used to prepare a series of polymers sulfonated to 33 mol %, 44 mol % and 51 mol %. Reactant time and reacting concentrations were varied to produce the range of sulfonation values. Membranes were prepared for each polymer, and sulfonation level was correlated with percent water uptake and ionic conductivity of the membrane. Results appear in Table 2. It can be seen that percent water uptake and ionic conductivity increased with increasing sulfonation level.

TABLE 2

| Sulfonation m mol % | % water uptake | Ionic Conductivity, ohm/cm$^2$ |
|---|---|---|
| 33.00 | 125 | 0.0695 |
| 44.00 | 200 | 0.0895 |
| 51.00 | 349 | 0.0985 |

5. Preparation of Hydrogenated SBR (HSBR)

The method of S. F. Hahn (J. Polymer Science: Part A: Polymer edition 1992, Vol. 30, 397–408) was employed to hydrogenate a commercially available SBR (Scientific Polymer Products, Inc., MW 600,000). The SBR polymer (40 grams) was dissolved in 1 L o-xylene in a 2 L three neck round bottom flask. p-toluenesulfonyl hydrazide (TSH) (150 grams) and tri-n-propyl amine (NPA) (112 grams), two moles each of TSH and NPA per mole of unsaturation, were added to the flask. The mixture was held at reflux (135–140° C.) in an oil bath for 5 hrs during which the reaction mixture became light orange. The mixture was washed four times with 500 mL deionized water and precipitated with three times to four times its volume of methanol. The recovered white polymer was dried at room temperature overnight and then in a vacuum oven at 90° C. for 5 hrs.

6. Sulfonation of Hydrogenated SBR

The hydrogenated SBR(10 grams) was cut into small pieces and dissolved in 400 grams of 1,2-dichloroethane (DCE) in about 4 hrs at 45° C. An acetyl sulfate reagent was prepared by adding 28 mL sulfuric acid to a solution of 76 mL acetic anhydride in 400 mL DCE at 0° C. This yielded a 1M acetyl sulfate reagent as a clear and colorless solution. After stirring at 0° C. for 30 minutes, the reagent was allowed to warm up to room temperature (1 hour). To the hydrogenated SBR solution, the desired amount of 1M acetyl sulfate reagent was added in one shot. Addition of 60 mL 1M acetyl sulfate and the subsequent stirring of the mixture at 45° C. for 5 hrs yielded 44 mol % sulfonated hydrogenated SBR (equivalent weight=540 grams/equivalent). A 32 mol % (equivalent weight=740 grams/equivalent) sulfonated hydrogenated SBR was obtained when 40 mL 1M acetyl sulfate reagent was used. After quenching the reactions with n-propanol (100 grams), the mixture was evaporated under vacuum to obtain a viscous solution with 7 wt.% solids.

7. (Comparative) Preparation of an Ionically Conductive Hydrogenated Sulfonated Block Copolymer Membrane A hydrogenated block copolymer of styrene and butadiene (SEBS), sold by Shell Chemical Company under the trade name Kraton G-1650, was obtained. The SEBS polymer (10 grams) was sulfonated as in Example 1.

8. Comparative Testing: SBR v. SEBS Fuel Cell Performance and Water Uptake

Performance of the sulfonated hydrogenated statistical styrene/butadiene copolymer membrane in a fuel cell was compared to that of a membrane composed of a block copolymer of similar composition. Films of thickness 2–5 mil were cast from the above solutions (Examples 5–6). After washing the resulting membranes thoroughly with distilled water, the films were dried, titrated and their conductivity measured. The membrane was hot pressed between two porous carbon catalyst electrodes using low pressure. The electrodes, obtained from the Dais Corporation, are described in U.S. Pat. No. 5,677,074. The carbon electrodes had a platinum loading of 0.6 mg/cm$^2$ of flat area.

A control membrane, which incorporated a 3 mil 60 mol % sulfonated SEBS polymer (EW=580 grams/equivalent) was compared to several membranes prepared using hydrogenated sulfonated SBR. Each membrane was washed thoroughly with distilled water, dried and sandwiched between two porous carbon catalyst electrodes.

Results of the testing appear in Table 1. In the table, the abbreviation SEBS refers to the block copolymer of Example 2 and HSBR-01, HSBR-02, and HSBR-03 refer to the copolymers described in Example 1. The table shows that the performance of fuel cells incorporating sulfonated hydrogenated SBR is similar to the performance of the fuel cell incorporating the block copolymer control.

TABLE 1

| SAMPLE | Sulfonated H-SBR-01 | Sulfonated HSBR-02 | Sulfonated HSBR-03 | Sulfonated SEBS |
|---|---|---|---|---|
| Equivalent Weight, grams/equivalent | 790 | 740 | 540 | 560 |
| % Sulfonation | 30 | 32 | 44 | 62 |
| Thickness, mil | 2.5 | 3.5 | 2.5 | 2.5 |
| Cell Area Cm$^3$ | 5.29 | 5.29 | 5.29 | 5.29 |
| Open Circuit (V) | 0.97 | 0.95 | 0.97 | 0.97 |
| Current Density @ 0.5 V, mA/cm$^2$ | 189 | 189 | 327 | 336 |
| Power Density mW/cm$^2$ | 95 | 95 | 164 | 168 |
| Run Time, hrs. | 2.5 | 4 | 2 | 1 |

While the invention has been particularly shown and described with reference to preferred embodiments thereof, it will be understood by those skilled in the art that various changes in form and details may be made therein without departing from the spirit and scope of the invention.

What is claimed is:

1. A method of conditioning air for an enclosure by transferring heat and moisture between a first stream of outside ambient air and a second stream of enclosure return air comprising:
    disposing a water-conducting membrane between said first and second stream, said water-conducting membrane having at least two opposed surfaces and comprising a sulfonated statistical copolymer, said statistical copolymer comprising at least one arylvinyl monomer and at least one olefin monomer, and wherein aromatic moieties derived from the arylvinyl monomer are at least partially sulfonated; and
    contacting the first and second gas stream with an opposite surface of said water-conducting membrane, whereby heat and moisture are transferred from the first stream of outside ambient air to the second stream of enclosure return air.

2. A method according to claim 1 wherein the statisitical copolymer comprises from about 20 weight percent to about 80 weight percent arylvinyl monomer.

3. A method according to claim 1 wherein said arylvinyl monomer is selected from styrene, vinyl toluene, and α-methylstyrene.

4. A method according to claim 1 wherein the aromatic moieties derived from the arylvinyl monomer comprise from about 20 mole percent aromatic sulfonate to about 80 mole percent aromatic sulfonate.

5. A method according to claim 1 wherein the aromatic moieties derived from the arylvinyl monomer comprise from about 20 mole percent aromatic sulfonate to about 50 mole percent aromatic sulfonate.

6. A method according to claim 1 wherein the aromatic moieties derived from the arylvinyl monomer comprise from about 30 mole percent aromatic sulfonate to about 50 mole percent aromatic sulfonate.

7. A method according to claim 1 wherein said arylvinyl monomer is styrene.

8. A method according to claim 1 wherein the statisitical copolymer comprises from about 20 weight percent to about 80 weight percent styrene.

9. A method according to claim 1 wherein the aromatic moieties derived from styrene comprise from about 20 mole percent styrene sulfonate to about 80 mole percent styrene sulfonate.

10. A method according to claim 1 wherein the aromatic moieties derived from styrene comprise from about 20 mole percent styrene sulfonate to about 50 mole percent styrene sulfonate.

11. A method according to claim 1 wherein the aromatic moieties derived from styrene comprise from about 30 mole percent styrene sulfonate to about 50 mole percent styrene sulfonate.

12. A method according to claim 1 wherein said olefin monomer is selected from the group consisting of ethylene, propylene, 1-butene, 2-butene, 1-pentene, 4-methyl-1-pentene, 1-hexene, 1-octene, butadiene, and isoprene.

13. A method according to claim 12 wherein said olefin monomer is ethylene.

14. A method according to claim 1 wherein said statisitical copolymer comprises styrene and ethylene.

15. A method according to claim 1 wherein said statisitical copolymer comprises styrene and butadiene.

16. A heat and moisture exchanger core for transferring heat and moisture between a first stream of outside ambient air and a second stream of enclosure return air comprising a water-conducting membrane disposed between the first stream of outside ambient air and the second stream of enclosure return air, said water-conducting membrane comprising a sulfonated statistical copolymer, said statistical copolymer comprising at least one arylvinyl monomer and at least one olefin monomer, wherein aromatic moieties derived from the arylvinyl monomer are at least partially sulfonated;
    whereby heat and moisture are transferred from the first stream of outside ambient air to the second stream of enclosure return air.

17. The heat and moisture exchanger core of claim 16, wherein the statisitical copolymer comprises from about 20 weight percent to about 80 weight percent arylvinyl monomer.

18. The heat and moisture exchanger core of claim 16, wherein the aromatic moieties derived from the arylvinyl monomer comprise from about 20 mole percent aromatic sulfonate to about 80 mole percent aromatic sulfonate.

19. The heat and moisture exchanger core of claim 16, wherein the aromatic moieties derived from the arylvinyl monomer comprise from about 20 mole percent aromatic sulfonate to about 50 mole percent aromatic sulfonate.

20. The heat and moisture exchanger core of claim 16, wherein the aromatic moieties derived from the arylvinyl monomer comprise from about 30 mole percent aromatic sulfonate to about 50 mole percent aromatic sulfonate.

21. The heat and moisture exchanger core of claim 16, wherein said arylvinyl monomer is styrene.

22. The heat and moisture exchanger core of claim 16, wherein said olefin monomer is selected from the group consisting of ethylene, propylene, 1-butene, 2-butene, 1-pentene, 4-methyl-1-pentene, 1-hexene, and 1-octene.

23. The heat and moisture exchanger core of claim 22, wherein said olefin monomer is ethylene.

24. The heat and moisture exchanger core of claim 16, wherein said statistical copolymer comprises styrene and ethylene.

25. An apparatus for conditioning air for an enclosure comprising a heat and moisture exchanger core for transferring heat and moisture between a first stream of outside ambient air and a second stream of enclosure return air, said heat and moisture exchanger core comprising a water-conducting membrane disposed between a first stream of outside ambient air and a second stream of enclosure return air, said water-conducting membrane comprising a sulfonated statistical copolymer, said statistical copolymer comprising at least one arylvinyl monomer and at least one olefin monomer, wherein aromatic moieties derived from the arylvinyl monomer are at least partially sulfonated;

whereby heat and moisture are transferred from the first stream of outside ambient air to the second stream of enclosure return air.

26. The apparatus of claim 25, wherein the statisitical copolymer comprises from about 20 weight percent to about 80 weight percent arylvinyl monomer.

27. The apparatus of claim 25, wherein the aromatic moieties derived from the arylvinyl monomer comprise from about 20 mole percent aromatic sulfonate to about 80 mole percent aromatic sulfonate.

28. The apparatus of claim 25, wherein the aromatic moieties derived from the arylvinyl monomer comprise from about 20 mole percent aromatic sulfonate to about 50 mole percent aromatic sulfonate.

29. The apparatus of claim 25, wherein the aromatic moieties derived from the arylvinyl monomer comprise from about 30 mole percent aromatic sulfonate to about 50 mole percent aromatic sulfonate.

30. The apparatus of claim 25, wherein said arylvinyl monomer is styrene.

31. The apparatus of claim 25, wherein said olefin monomer is selected from the group consisting of ethylene, propylene, 1-butene, 2-butene, 1-pentene, 4-methyl-1-pentene, 1-hexene, and 1-octene.

32. The apparatus of claim 31, wherein said olefin monomer is ethylene.

33. The apparatus of claim 25, wherein said statisitical copolymer comprises styrene and ethylene.

* * * * *